(12) United States Patent
Mesarina et al.

(10) Patent No.: US 7,043,557 B2
(45) Date of Patent: May 9, 2006

(54) LOW POWER SCHEDULING FOR MULTIMEDIA SYSTEMS

(75) Inventors: Malena Rosa Mesarina, Palo Alto, CA (US); Yoshio Frank Turner, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 840 days.

(21) Appl. No.: 09/895,048

(22) Filed: Jun. 29, 2001

(65) Prior Publication Data

US 2003/0028659 A1   Feb. 6, 2003

(51) Int. Cl.
G06F 1/28 (2006.01)
G06F 15/16 (2006.01)

(52) U.S. Cl. .................. 709/231; 709/232; 713/300

(58) Field of Classification Search ........... 709/231, 709/247, 236, 248, 205, 207, 200–203, 230–238; 718/102, 103, 107, 300–340
See application file for complete search history.

(56) References Cited

U.S. PATENT DOCUMENTS

| 6,401,126 B1 * | 6/2002 | Douceur et al. ............. 709/231 |
| 6,483,846 B1 * | 11/2002 | Huang et al. ............... 370/445 |
| 6,614,804 B1 * | 9/2003 | McFadden et al. ......... 370/468 |
| 6,735,629 B1 * | 5/2004 | Cafarelli et al. ............ 709/224 |

OTHER PUBLICATIONS

Manzak, A. & Chakrabrti, C. (2000). Variable voltage task scheduling for minimizing energy or minimizing power. IEEE,, 3239-3242.*

"Scheduling for Reduced CPU Energy", Weiseret et al., Xerox PARC, Palto Alto CA, First Symposium on Operating Systems Designs & Implementation (OSDI).

"Power Conscious Fixed Priority Scheduling for Hard Real Time Systems", Shin et al., Seoul Nat. University, Seoul, Korea.

"Sceduling Algorithms for Multiprogramming in a Hard Real Time Environment", Liu et al., Massachusetts Institute of Technology, CA Institute of Technology, Journalof the Assoc. for Computing Machinery, vol. 20, No. 1, Jan. 1973, pp. 46-61.

"Comparing Algorithms for Dynamic Speed-Setting of a Low-Power CPU", Govil et al., Computer Science Division, USC, Berkeley, CA.

"Power Optimization of Variable Voltage Core-Based Systems", Hong et al., Computer Science Dept., UCLA, LA, CA, Electrical Engineering Dept., UCLA.

"A Scheduling Model for Reduced CPU Energy", Yao et al., Xerox Palo Alto Rea search Center, Palo Alto, CA, 19955.

* cited by examiner

Primary Examiner—Saleh Najjar
Assistant Examiner—Asad Muhammad Nawaz
(74) Attorney, Agent, or Firm—Richard P. Lange

(57) ABSTRACT

A method and system thereof for reducing the energy consumed when decoding an encoded and synchronized multimedia data stream, wherein the data stream is non-preemptable and subject to precedence constraints. In a client-server environment, the server delivers to the client the stream for decoding. The client has a processor operating on a discrete variable-voltage power supply. Prior to transmitting the stream to the client, the server produces an execution schedule according to the precedence constraints. The server also assigns a voltage setting for each task in the schedule, wherein each task decodes a frame in the stream without preemption. The server transmits the execution schedule and voltage settings to the client with the encoded data stream. The schedule and voltage settings reduce energy consumption by the client while satisfying multimedia timing constraints.

26 Claims, 7 Drawing Sheets

LOW POWER SCHEDULING FOR MULTIMEDIA SYSTEMS

TECHNICAL FIELD

The present invention relates to a method and system for processing encoded data. More specifically, the present invention pertains to a method and system for decoding encoded data in a battery-powered device.

BACKGROUND ART

Energy consumption is an important issue for portable battery-powered devices, such as but not limited to personal digital assistants (PDAs), laptop and notebook computer systems, video game consoles, DVDs (digital video devices), and the like. The central processing unit (CPU) can consume a significant portion of the energy of the system (perhaps as much as 12 percent), and is therefore an attractive target for minimizing energy consumption.

Variable voltage, variable speed CPUs are currently available for use in portable devices and provide a means for reducing energy consumption. The speed of the processor and its energy consumption can be controlled by adjusting the operating voltage of the processor. However, there is a tradeoff between energy consumption and quality of service. For example, by reducing the operating voltage, energy consumption is reduced but so is the speed of the processor.

Generally, there are two types of variable voltage/speed CPUs: those with a continuous variable voltage supply and those with a discrete variable voltage supply. An advantage of the "discrete" type over the "continuous" type is a faster response time. There is a latency associated with adjusting the operating voltage of a continuous type of CPU. With a discrete type of CPU, response times measured in microseconds are available.

Emerging uses for portable devices include multimedia applications such as video telephony, video games, and MPEG (Motion Pictures Experts Group) movies. These applications impose strict quality of service requirements in the form of timing constraints. If energy consumption was not a factor, then operating a variable voltage CPU at its highest speed would be best for meeting the timing constraints. However, high speed operation of the CPU can quickly drain the batteries of the portable device.

A multimedia application, such as an MPEG movie, consists of an encoded (compressed) video stream and an encoded audio stream. For quality playback, each stream must be displayed at its sampling rate ("intrastream"), and the two streams must be synchronized ("interstream"). For instance, the sampling rates of video and audio can be 33 fps (frames per second) and 44K samples per second. The synchronization between corresponding video and audio frames should be within about 80 ms (milliseconds) to avoid perceptible degradation.

For multimedia decoding applications, the processing speed and energy consumption required for a given quality of service depend on frame timing constraints and on task complexity. Timing constraints in turn depend on frame decoding order requirements, client display buffer availability, and stream synchronization limits. Throughout the playback of a stream, the complexity of frame decoding and the time remaining to meet the next deadline vary dynamically, which raises the potential for selectively reducing processing speed to reduce energy consumption when timing constraints can be met easily.

For multimedia applications such as an MPEG movie, there are two other factors that must be considered during decoding: the encoded data stream is both non-preemptable and is subject to precedence constraints (particularly, the video portion). "Non-preemptable" means that decoding is done sequentially from frame to frame, and that an audio or video frame is entirely decoded before the next frame is decoded (that is, decoding of another frame will not begin until the current frame is decoded). "Precedence constraints" means that there are constraints on the order in which video frames can be decoded. For example, in the MPEG format, to decode a "B" frame, the previous (in display order) "I" or "P" frame and the next "P" frame are referenced. Thus, decoding needs to occur in a particular order because, in some instances, certain frames are needed to decode other frames.

In the prior art, attempts have been made to develop approaches for efficiently decoding multimedia applications, but these approaches are generally lacking in one or more respect. Namely, these prior art approaches do not function with a discrete variable supply voltage, non-preemptable tasks, precedence constraints, and/or real time constraints.

Accordingly, what is needed is a method and/or system that can reduce the energy consumption for the decoding (as well as the display) of multimedia data streams such as MPEG-encoded synchronized multimedia streams. What is also needed is a method and/or system that can satisfy the above need and that can be used for non-preemptable tasks and for tasks that are subject to precedence constraints. Furthermore, what is needed is a method and/or system that can satisfy the above needs and that can be used for multimedia applications with real time constraints on audio and video sampling rates and on intrastream and interstream synchronization. In addition, what is needed is a method and/or system that can satisfy the above needs and that can be used with a portable device that has a processor that operates on a discrete variable voltage power supply and that has limited buffer capacity. The present invention provides a novel solution to the above needs.

DISCLOSURE OF THE INVENTION

The present invention provides a method and system thereof that can reduce the energy consumption for the decoding (as well as the display) of multimedia data streams such as MPEG-encoded synchronized multimedia streams. The present invention also provides a method and system that can be used for non-preemptable tasks and for tasks that are subject to precedence constraints. Furthermore, the present invention provides a method and system that can be used for multimedia applications with real time constraints on audio and video sampling rates and on intrastream and interstream synchronization. In addition, the present invention provides a method and system that can be used with a portable device that has a processor that operates on a discrete variable voltage power supply and that has limited buffer capacity.

The present invention pertains to an efficient off-line scheduling method and system that assign voltages to decoding tasks such that synchronization constraints are met and energy use is minimized in a device with a discrete variable voltage processor and a fixed number of buffers (display buffers), without overflowing or underflowing the buffers. The present invention assigns a single voltage per task, and each task decodes without preemption a single media frame (audio or video). The present invention also determines the order in which the tasks are decoded, subject to precedence constraints. Namely, tasks within a stream are constrained to a fixed partial order of execution. The present invention constructs an interleaved (audio and video) total order of execution that does not violate the partial order of any stream.

In one embodiment, the present invention is employed by a server device (e.g., a media server) that delivers media data to a client device (e.g., a portable appliance) via a client-server network. The data stream may include multimedia data, including an audio portion and a video portion.

In accordance with the present invention, two interdependent operations are used. One is to schedule the order of interleaving of the audio and video frame decoding tasks, subject to the precedence constraints within each stream. The other is to assign to each frame (each task) the voltage and/or frequency (processor speed) at which the frame is to be processed (decoded).

In the present embodiment, the server generates the execution schedule for decoding the encoded data stream. The server has knowledge of the capabilities (e.g., hardware configuration) of the client device. Based on this knowledge, the server assigns a processor setting (e.g., a voltage level or clock speed) to each task in the execution schedule. The server then transmits to the client device the execution schedule and the processor settings for the tasks in the schedule. In one embodiment, this information is transmitted to the client device along with the encoded multimedia stream. The client device then decodes the encoded stream according to the execution schedule, performing each task at the specified processor setting.

Thus, in accordance with the present invention, the execution schedule and voltage settings to be used by the client device are determined off-line from the client by a server and then transmitted to the client. The schedule ensures that the timing constraints of the multimedia data are satisfied and that energy consumption is minimized for a client device having a fixed number of buffers, so that buffer capacity is not exceeded.

These and other objects and advantages of the present invention will become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1A:
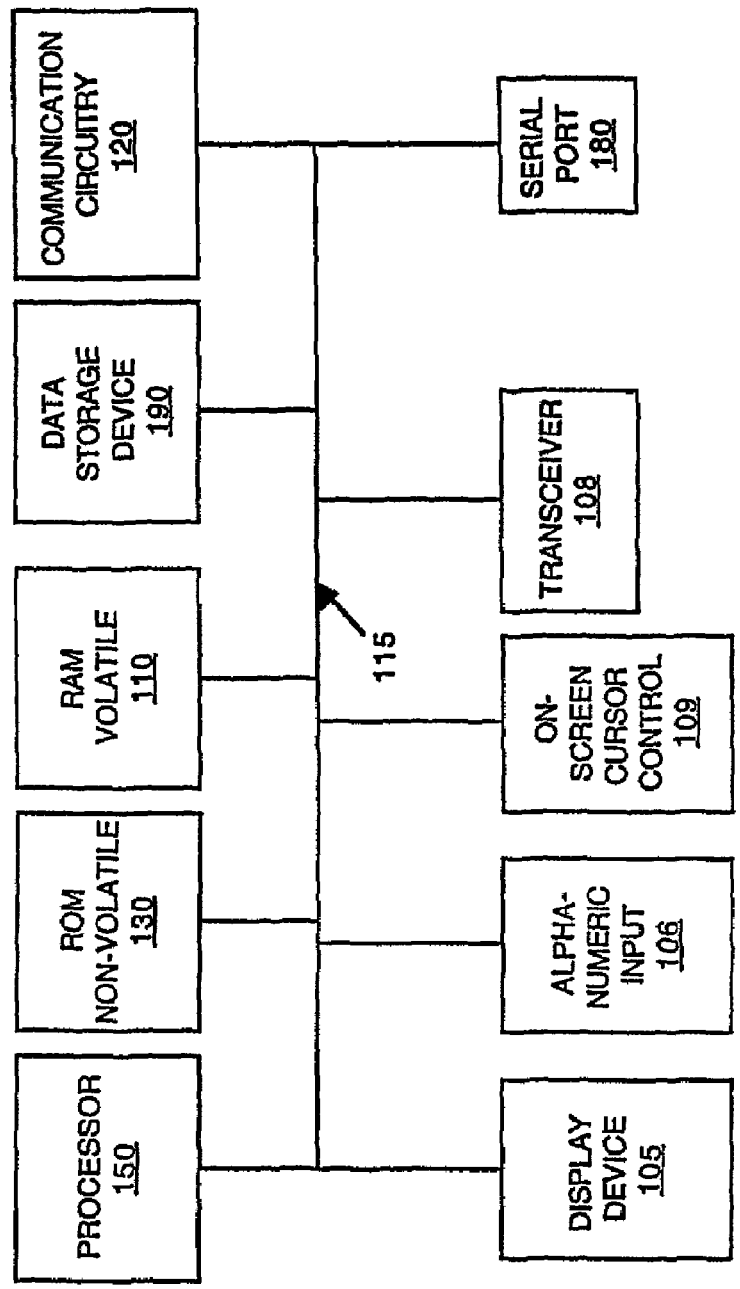
FIG. 1A is a block diagram of an exemplary portable device upon which embodiments of the present invention may be practiced.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "assigning," "generating," "transmitting," "executing," "selecting," "receiving" or the like, refer to actions and processes (e.g., processes 300 and 600 of FIGS. 3 and 6, respectively) of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

FIG. 1A is a block diagram of one embodiment of a portable device 100 (e.g., a client device) upon which embodiments of the present invention may be implemented. Portable device 100 may be a PDA (personal digital assistant), a PID (personal information device), or a palmtop, notebook, laptop, or hand-held computer system. In alternate embodiments, portable device 100 may be a video game console, a video telephony device, or a DVD (digital video device). In general, portable device 100 provides the capability to process (decode) and display multimedia data streams, such as but not limited to MPEG (Motion Pictures Experts Group) movies.

Portable device 100 includes an address/data bus 115 for communicating information, a central processor 150 coupled with the bus 115 for processing information and instructions, a volatile memory 110 (e.g., random access memory, RAM) coupled with the bus 115 for storing information and instructions for the processor 150, and a non-volatile memory 130 (e.g., read only memory, ROM) coupled with the bus 115 for storing static information and instructions for the processor 150. Portable device 100 also includes an optional data storage device 190 coupled with the bus 115 for storing information and instructions. Device 190 can be removable, and may be embodied as a compact disk, DVD disk, memory stick, or the like.

Portable device 100 also contains a display device 105 coupled to the bus 115 for displaying information to the computer user. The display device 105 utilized with portable device 100 may be a liquid crystal display (LCD) device, a cathode ray tube (CRT), a field emission display device (also called a flat panel CRT), or other display device suitable for generating graphic images and alphanumeric characters recognizable to the user.

In the present embodiment, processor 150 is a variable voltage, variable speed processor that operates on a discrete variable voltage supply. Such processors are known in the art. Accordingly, the speed and energy consumption of processor 150 can be controlled by adjusting the operating voltage of the processor.

Figure 2:
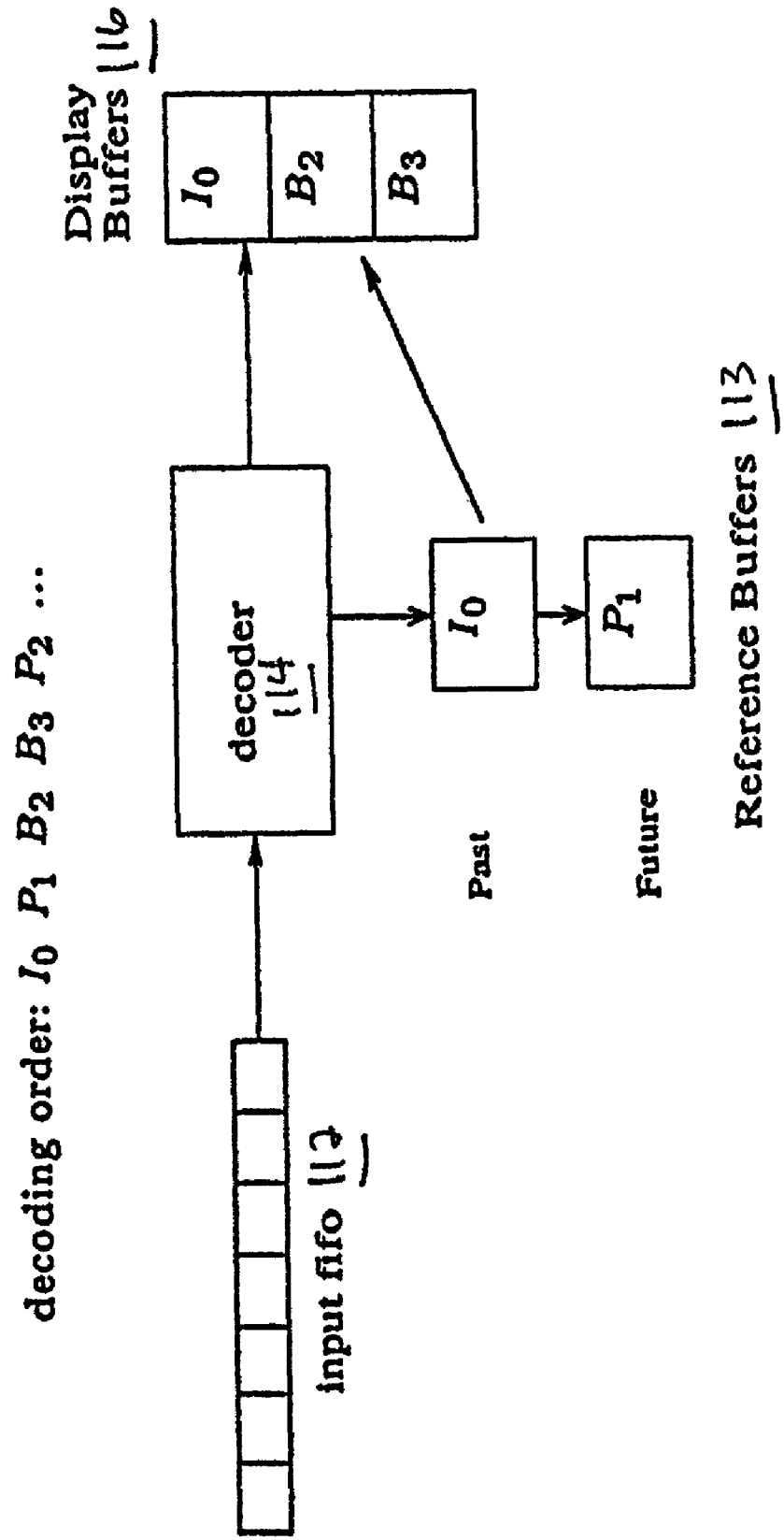
FIG. 2 is a block diagram exemplifying the decoding hardware organization used by a portable device in accordance with one embodiment of the present invention.

Also in the present embodiment, the memory units of portable device 100 (e.g., volatile memory 110) include one or more display buffers for processing (decoding) encoded multimedia data streams. Refer also to FIG. 2, below.

In one embodiment, portable device 100 includes a transceiver 108 providing it with the capability for wireless communication. The transceiver 108 provides a wireless radio frequency (RF) communication link between portable device 100 and other devices, using any of the various RF protocols and standards. It is appreciated that transceiver 108 may be integrated into portable device 100, or that transceiver 108 may be a separate component coupled to portable device using, for example, serial port 180.

Alternatively, a communication link can be established between portable device 100 and other devices via serial port 180 using a wired connection between the devices. Communication links, wired or wireless, can be established directly between portable device 100 and another device (e.g., a server device), or the communication link to another device can be established over a communication network such as the Internet or World Wide Web.

In the present embodiment, portable device 100 of FIG. 1A includes communication circuitry 120 coupled to bus 115. In one embodiment, communication circuitry 120 is a universal asynchronous receiver-transmitter (UART) module that provides the receiving and transmitting circuits required for serial communication for the serial port 180.

Also included in portable device 100 is an optional alphanumeric input device 106. Alphanumeric input device 106 can communicate information and command selections to processor 150 via bus 115. In one implementation, alphanumeric input device 106 is a touch screen device. Alphanumeric input device 106 may also be capable of registering a position where a stylus element (not shown) makes contact.

Portable device 100 also includes an optional cursor control or directing device (on-screen cursor control 109) coupled to bus 115 for communicating user input information and command selections to processor 150. In one implementation, on-screen cursor control device 109 is a touch screen device incorporated with display device 105.

Figure 1B:
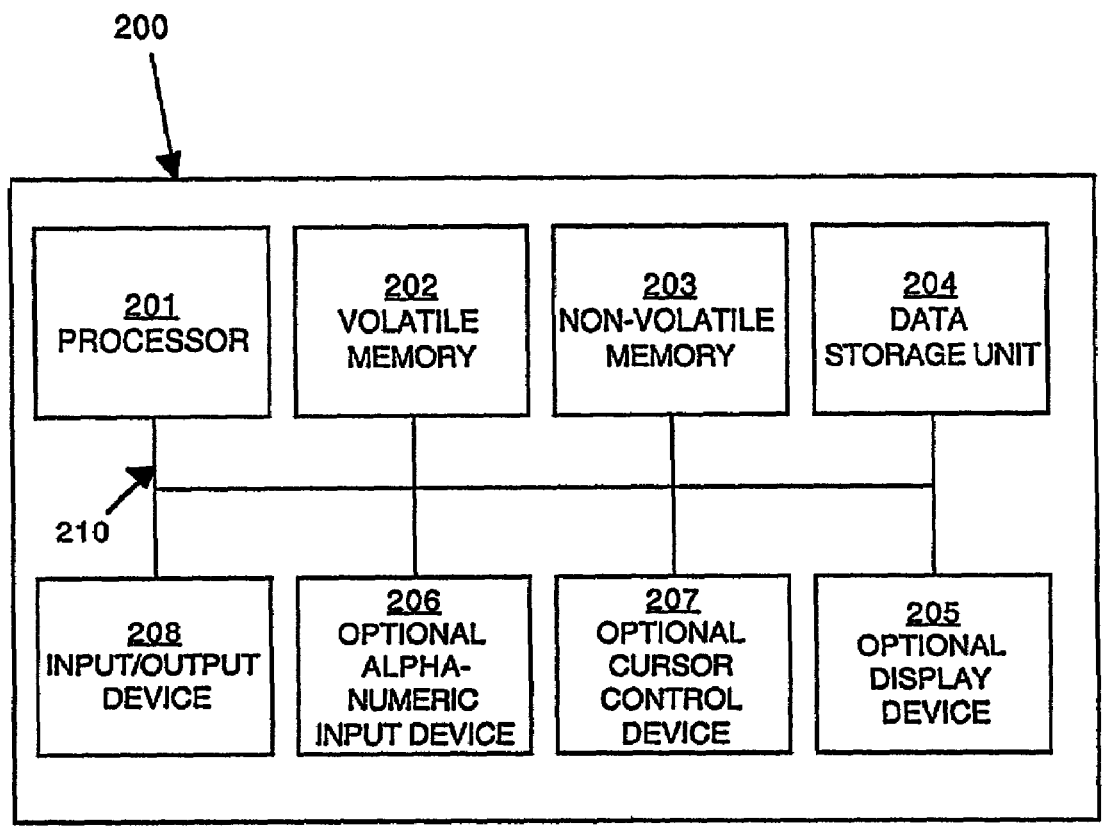
FIG. 1B is a block diagram of an exemplary computer system upon which embodiments of the present invention may be practiced.

FIG. 1B illustrates an exemplary computer system 200 (e.g., a server device) upon which embodiments of the present invention may be practiced. In general, computer system 200 comprises bus 210 for communicating information, processor 201 coupled with bus 210 for processing information and instructions, random access (volatile) memory (RAM) 202 coupled with bus 210 for storing information and instructions for processor 201, read-only (non-volatile) memory (ROM) 203 coupled with bus 210 for storing static information and instructions for processor 201, data storage device 204 such as a magnetic or optical disk and disk drive coupled with bus 210 for storing information and instructions, an optional user output device such as display device 205 coupled to bus 210 for displaying information to the computer user, an optional user input device such as alphanumeric input device 206 including alphanumeric and function keys coupled to bus 210 for communicating information and command selections to processor 201, and an optional user input device such as cursor control device 207 coupled to bus 210 for communicating user input information and command selections to processor 201.

With reference still to FIG. 1B, display device 205 utilized with computer system 200 may be a liquid crystal device, cathode ray tube, or other display device suitable for creating graphic images and alphanumeric characters recognizable to the user. Cursor control device 207 allows the computer user to dynamically signal the two-dimensional movement of a visible symbol (pointer) on a display screen of display device 205. Many implementations of the cursor control device are known in the art including a trackball, mouse, joystick or special keys on alphanumeric input device 206 capable of signaling movement of a given direction or manner of displacement. It is to be appreciated that the cursor control 207 also may be directed and/or activated via input from the keyboard using special keys and key sequence commands. Alternatively, the cursor may be directed and/or activated via input from a number of specially adapted cursor directing devices.

Computer system 200 also includes an input/output device 208 (a communication interface), which is coupled to bus 210 for providing a communication link between computer system 200 and another device (e.g., a client device), either directly or through a network. It should be appreciated that within the present embodiment, input/output device 208 provides the functionality to transmit and receive information over a wired as well as a wireless communication interface. It should be further appreciated that the present embodiment of input/output device 208 is well suited to be implemented in a wide variety of ways. For example, input/output device 208 could be implemented as a modem.

FIG. 2 is a block diagram exemplifying the decoding hardware organization used by a portable device (e.g., portable device 100 of FIG. 1A) in accordance with one embodiment of the present invention. FIG. 2 shows a implementation for video data; it is understood that a similar type of approach can be used for audio data.

The decoding process includes essentially three steps: input, decoding, and display. Encoded data are received at an input buffer (input fifo 112). In this embodiment, input fifo 112 masks any jitter on the input channel. Decoder 114 (e.g., a variable voltage CPU such as processor 150 of FIG. 1A) retrieves each frame of video data from input fifo 112, decodes it, and places the result in one of the video display buffers 116. Decoded frames are removed from the display buffers 116 by the display hardware (not shown in FIG. 2), which displays video frames simultaneously with audio frames.

The order of decoding and display can differ for video, for example, when bi-directional predictive coded frames ("B" frames) are used. To decode a B frame, the previous (in display order) "I" or "P" frame and the next P frame are referenced. Therefore, reference buffers 113 are dedicated to storing I and P reference frames.

Figure 3:
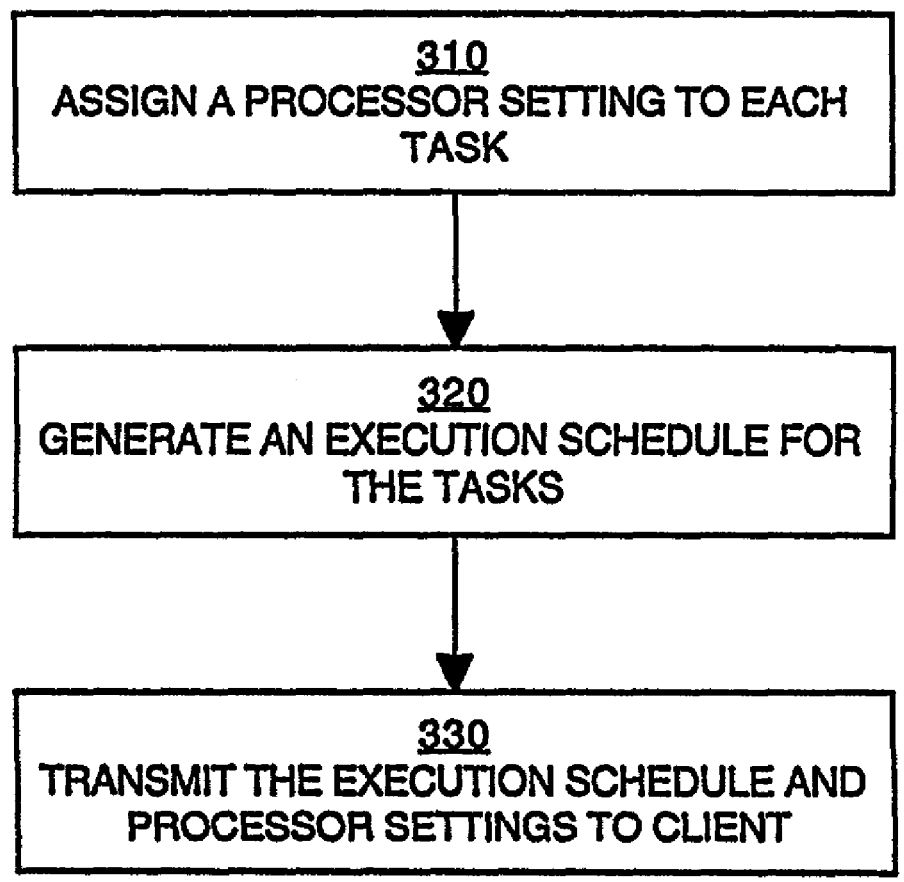
FIG. 3 is a flowchart showing the steps in a process implemented by a server device for decoding encoded data in accordance with one embodiment of the present invention.

FIG. 3 is a flowchart showing the steps in a process 300 implemented by a server device (e.g., computer system 200 of FIG. 1B) for decoding encoded data in accordance with one embodiment of the present invention. Process 300 generates dynamic voltage settings for each decoding task such that energy consumption by the decoding device (e.g., portable device 100 of FIG. 1A) is reduced.

Process 300 is performed off-line of the decoding device to generate a schedule for executing decoding tasks and to specify processor settings to be used by the decoding device when it executes the decoding tasks. The execution schedule and processor settings are then sent to the decoding device, either along with or separate from the encoded data that are to be decoded. In order to generate the execution schedule and voltage settings, computer system 200 does not need to decode the encoded multimedia data stream.

In step 310 of FIG. 3, in the present embodiment, a processor setting is assigned to each decoding task, wherein each task decodes without preemption a single frame of encoded media data. In one embodiment, the processor setting corresponds to a voltage level for operating the variable voltage CPU of the decoding, or client, device (that is, processor 150 of portable device 100 of FIG. 1A). In another embodiment the processor setting corresponds to a speed, or frequency, at which processor 150 is operated.

Each frame can be decoded at a different processor setting. To determine the correct setting for each task, the energy consumption and execution time at each voltage setting used by processor 150 is determined for each frame using a technique known in the art. One known technique for obtaining this information is by using an instruction-level CPU simulator extended to output cycle-by-cycle energy consumption. Other techniques may also be used, such as direct measurement of an equivalent client platform.

In general, computer system 200 has knowledge of the various types of decoding (client) devices and their respective capabilities. This information may include, for each of the various types of client devices, the processor speed, the range of discrete voltage settings used by the processor, the display capabilities, and other such information. Computer system 200 also has knowledge of the amount of energy (e.g., voltage) needed by the various types of decoding devices to perform each of the various decoding tasks. Parameters used in one embodiment of the present invention are listed in Table 1.

TABLE 1

| | Exemplary Parameters |
|---|---|
| b, b' | extra video and audio display buffers (example: b = 1 for double buffering) |
| $D_i, D'_j$ | display time for video frame $\tau_i$ and audio frame $\tau'_j$ |
| E | total energy consumption |
| $E_{idle}$ | the energy consumed in one time unit in idle mode |
| $E_{i,l}$ | the energy spent by video task $\tau_i$ at voltage level l |
| $E'_{j,l}$ | the energy spent by audio task $\tau'_j$ at voltage level l |
| K | synchronization skew between the end of display of a video and audio frame ($0 \leq K \leq K_{max}$) |
| $M_i, M'_j$ | minimum start times for video frame $\tau_i$ and audio frame $\tau'_j$ |
| $R_i, R'_j$ | decoding deadlines for video frame $\tau_i$ and audio frame $\tau'_j$ |
| $T_s, T'_s$ | sample time (normalized to 1 ms units of time) for video and audio frames |
| $T_{i,l}$ | the execution time of video task $\tau_i$ at voltage level l |
| $T'_{j,l}$ | the execution time of audio task $\tau'_j$ at voltage level l |
| $t_0$ | the time of display of the first video frame |
| $\tau_i$ | frame i of the video stream i = 0, 1, 2, . . . , N-1 |
| $\tau'_j$ | frame j of the audio stream i = 0, 1, 2, . . . , N'-1 |
| $v_l$ | the supply voltage for l = 0, . . . , $l_{max}$ number of discrete voltages |

In step 320 of FIG. 3, in the present embodiment, an execution schedule defining the sequence for performing the decoding tasks is generated by computer system 200 (FIG. 1B). For video, the present invention accounts for the fact that the order of decoding and display may be different.

For video, the mapping from decode order ($\tau_0, \tau_1, \tau_2, \ldots$) to display order ($\tau_{d(0)}, \tau_{d(1)}, \tau_{d(2)}, \ldots$) is represented by d(i):

$d(i)=i-1$ if $\tau_i$ is a B frame; $i+m(i)$ if $\tau_i$ is a P frame or I frame;

where m(i) is the number of consecutive B frames immediately after $\tau_i$ in decode order.

The display time $D_i$ of video task $\tau_i$ is $t_0+T_s \cdot d(i)$. Similarly, the display time $D'_j$ of audio task $\tau'_j$ is $t_0+T'_s \cdot j+K$. Note that the video stream begins no earlier than the audio stream because video ahead of audio is tolerated better than the reverse.

Each frame is decoded before its display time. In addition, a frame used as a forward reference frame (e.g., P frames, and some I frames) is decoded before the display time of the B frame that follows it immediately in decode order. Therefore, the decoding deadline $R_i$ for task $\tau_i$ is the following:

$R_i=D_i$ if $\tau_i$ is a B frame, or ($\tau_i$ is an I frame and $\tau_{i+1}$ is an I frame or a P frame); $D_{i+1}$ if $\tau_i$ is a P frame, or ($\tau_i$ is an I frame and $\tau_{i+1}$ is a B frame).

The minimum start time $M_i$ for the decoding of video frame $\tau_i$ is determined by the fixed decoding order within a stream and by the video display buffer capacity. For those P and I frames that are decoded into reference buffers instead of the display buffers, the minimum start times are determined only by the fixed decode order. Thus, for those frames, $M_i=M_{i-1}$. Otherwise, for all other frames that do not satisfy this condition, the minimum start time is the maximum of $M_{i-1}$ and the time when decoding gets as far ahead of the display process as possible. That limit is determined by the size of the display buffer. Therefore, $M_i$ equals the maximum of $M_{i-1}$ and the display time of the frame which is 'b' ahead of $\tau_i$ in display order. That frame is $\tau_{d^{-1}(d(i)-b)}$.

For audio task $\tau_j'$, the minimum start time $M_j'$ depends only on the display buffer occupancy. Thus:

$$M_j' = D_{j-b'}$$

$$M_i = \begin{cases} M_{i-1} & \text{if } (\tau_i \text{ is } I/P \text{ and } \tau_{i-1} \text{ is } B) \text{ or } (\tau_i \text{ is } P \\ & \text{ and } \tau_{i-1} \text{ is } I) \text{ or } (\tau_i \text{ is } I \text{ and } \tau_{i-1} \text{ is} \\ \max(M_{i-1}, D_{d^{-1}(d(i)-b)}) & P); \text{if } (\tau_i \text{ is } I \text{ and } \tau_{i-1} \text{ is } I) \text{ or } (\tau_i \\ & \text{ is } P \text{ and } \tau_{i-1} \text{ is } P) \text{ or } (\tau_i \text{ is } B); \\ 0 & \text{if } i = 0. \end{cases}$$

Using the voltage settings ($v_i$ or $v_j'$) for each task ($\tau_i$ or $\tau_j'$), the present invention finds a non-preemptive execution schedule such that frames in a stream are processed in decode order, the processing satisfies the minimum start time and deadline constraints, and the total energy consumption E is minimized, where:

$$E = \sum_{i=0}^{N-1} E_{i,v_i} + \sum_{j=0}^{N'-1} E'_{j,v_j'}.$$

The execution schedule interleaves the audio and video decode tasks such that the audio and video are synchronized. That is, the sequence of tasks defined by the execution schedule includes both audio and video decode tasks ordered so that the sound and display are synchronized without perceptible degradation.

In step 330 of FIG. 3, the execution schedule and voltage settings are sent from the server device (e.g., computer system 200 of FIG. 1B) to the client, or decoding, device (e.g., portable device 100 of FIG. 1A). In one embodiment, the execution schedule and voltage settings are sent with the encoded multimedia data stream from computer system 200 to portable device 100. In one such embodiment, the execution schedule and voltage settings are embedded in the multimedia data stream. For example, the encoded multimedia data stream, with the execution schedule and voltage settings (embedded or otherwise), can be transported from computer system 200 to portable device 100 via a wired or wireless connection, directly or indirectly. In the latter (indirect) case, the multimedia data stream (with the execution schedule and voltage settings) could be sent from computer system 200 to portable device 100 via the Internet, or from computer system 200 to a broadcast system which forwards the multimedia data stream, execution schedule and voltage settings to portable device 100. Also, the multimedia data stream, execution schedule, and voltage settings could be stored on a DVD disk, for example, and loaded onto portable device 100.

In another embodiment, the execution schedule and voltage settings are provided to portable device 100 separate from the encoded multimedia data stream and perhaps at different times. For example, the execution schedule and voltage settings could be provided to portable device 100 in one stream of data, and the encoded multimedia data in another. Also, the encoded multimedia data may be provided to portable device 100 via, for example, a DVD disk, while the execution schedule and voltage settings are provided to portable device 100 via a separate mechanism, perhaps as part of a key for decrypting the encoded multimedia data should that data be encrypted. A person of ordinary skill in the art will be able to conceive of other mechanisms for providing the encoded multimedia data, the execution schedule and the voltage settings to portable device 100.

Returning to step 320 of FIG. 3, to efficiently generate the execution schedule, the present invention implicitly rules out a large number of sequences of tasks without explicitly examining them. The present invention rules out some sequences by recognizing that many of the potential schedules share identical dependencies at particular intermediate points in their executions. Specifically, for simplicity of discussion, suppose that a number of feasible schedules all begin by executing (in various orders and at various voltage settings) exactly 'i' video frame tasks and 'j' audio frame tasks. Also suppose that each such schedule finishes processing the i video frame tasks and the j audio frame tasks at exactly the same time $T_{split}$. After time $T_{split}$, all of the schedules would have the same remaining work and the same time to meet future deadlines. Therefore, the schedule of tasks after $T_{split}$ is independent of the differences in the schedules prior to $T_{split}$.

Thus, in the present embodiment, each schedule is split into "subschedules": an initial subschedule prior to $T_{split}$ and a subsequent subschedule after $T_{split}$. A complete energy optimal schedule is then constructed by concatenating any minimum energy initial subschedule to any minimum energy subsequent subschedule.

In the present embodiment, the execution schedule is determined by placing minimum start-time constraints on each decoding task. The execution schedule is also determined for multiple synchronized (e.g., audio and video) streams of tasks, considering all feasible task orderings between streams. The display buffer size 'b' of the decoding device (e.g., portable device 100 of FIG. 1A) bounds the number of task orderings that can be considered, and also constrains the number of possible task completion times that are within a "time window."

Figure 4:
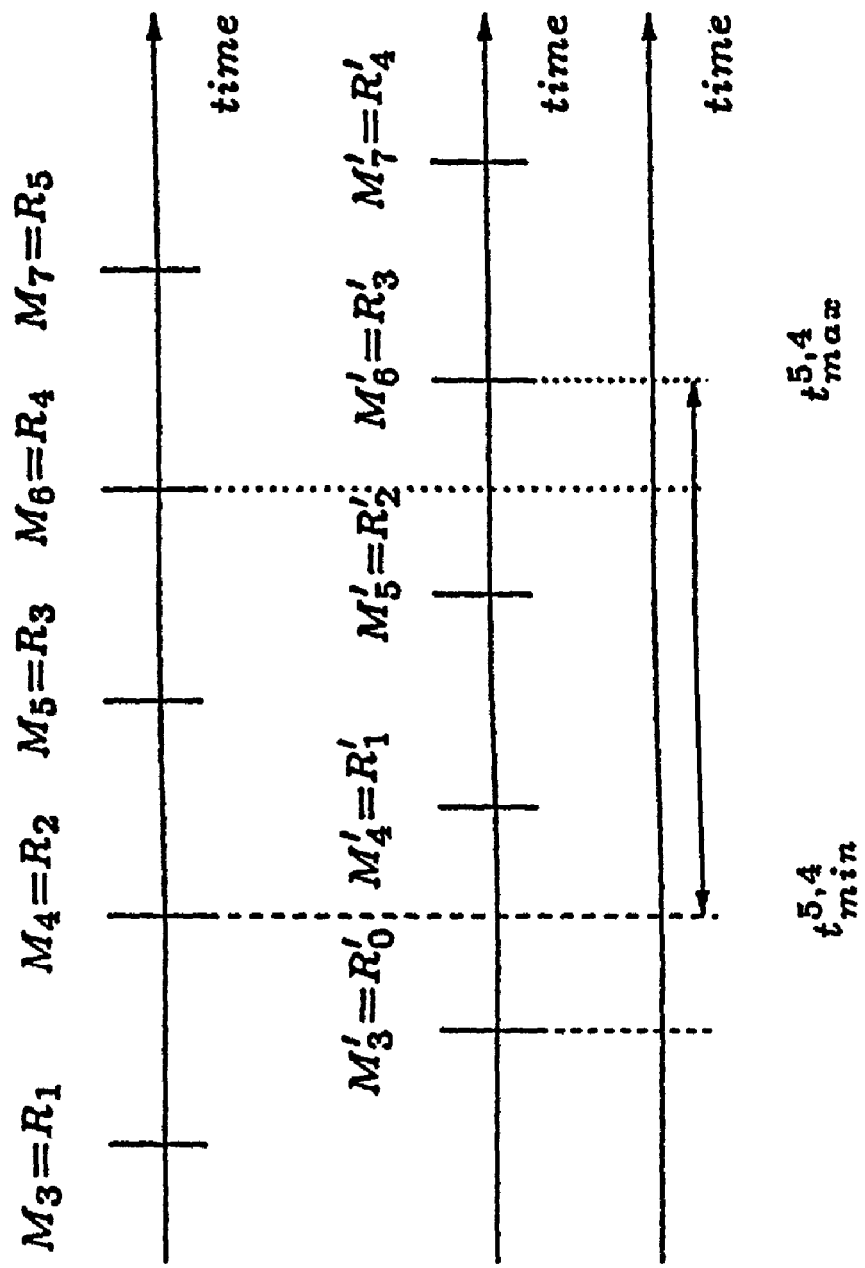
FIG. 4 exemplifies the relationship between start times and deadlines used to generate an execution schedule for decoding tasks in accordance with one embodiment of the present invention.

FIG. 4 illustrates an exemplary time window in accordance with one embodiment of the present invention. FIG. 4 shows example minimum start times and deadlines for each stream (audio and video). For simplicity of discussion, the video frames are assumed to be only I or B frames, so that the display time equals the decoding deadline (as in audio).

A time window $w_{i,j}$ is the time window in which 'i' and 'j' are the number of tasks in each stream (video and audio, respectively) that have executed. The range of times (t) within a time window includes the set of all permissible completion times of the last task executed (either $\tau_{i-1}$ or $\tau'_{j-1}$). Because for $w_{i,j}$ both $\tau_{i-1}$ and $\tau'_{j-1}$ have completed, the last task executed started after the minimum start time of both tasks. Thus, the lower end of the range of $w_{i,j}$ ($t_{i,j(min)}$) is given by $\max(M_{i-1}, M'_{j-1})$ and the upper end of the range of $w_{i,j}$ ($t_{i,j(max)}$) is given by $\max(R_{i-1}, R'_{j-1})$.

As an example, FIG. 4 shows an exemplary time window $w_{5,4}$. In this example, the lower end of the time window $W_{5,4}$ is $M_4$ because $M_4 > M'_3$. Also, the upper range of $W_{5,4}$ is $R'_3$ because $R'_3 > R_4$. In general, the length of any time window is bounded by the product of the sampling time and the number of display buffers for one stream.

The values of 'i' and 'j' are constrained by the condition that $t_{i,j(min)}$ is less than $\min(R_i, R'_j)$. If i and j violate this condition, then the associated time window starts too late to complete one or both of $\tau_i$ and $\tau'_j$, and this time window is not considered.

To understand how the condition $t_{i,j(min)} < \min(R_i, R'_j)$ limits the algorithm's complexity by limiting the combination of i and j values, consider the case of equal sampling times for the two streams: $T_s=T'_s$. Then, some algebra reveals that the condition is satisfied by j=1, 2, ... ,N' and $i \in [d^{-1}(j-b'+K/T_s), d^{-1}(j+b+K/T_s)]$. The intuition is as follows. As the skew K increases, the deadlines and minimum start times of the audio tasks are delayed relative to their corresponding video tasks. That decreases the task number of the next audio frame that can execute at each point in time without affecting the task number of the next video frame that can execute. Therefore, the allowed value of i is increased by $K/T_s$ relative to j, which explains the shift by $K/T_s$ in the range of i. If the skew K=0, then the audio and video frames in display at any time have the same display number, but the frames being decoded have display and decode numbers that depend on the state of the display buffers. For decoding, j gets the furthest ahead of i when the audio buffer is full and the video buffer is empty. In this case, d(i)=j–b', and $i=d^{-1}(j-b')$, the lower bound for i. Similarly, j is the furthest behind i in decoding when the video buffer is full and the audio buffer is empty. Thus $i=d^{-1}(j+b)$, the upper bound for i. If the lower bound is underrun, a video deadline is missed. If the upper bound is overrun, an audio deadline is missed.

The iterative steps of one embodiment of a method for generating an execution schedule in accordance with the present invention are described by the pseudocode listed in Table 2. The method of the present invention for generating an execution schedule is independent of the type of client (decoding) device. The specifics of the client device are input to the scheduling method (refer to Table 1, above). Thus, although the resultant execution schedule may be device-specific, the method of generating the schedule is independent of the type of device.

The scheduling process can be visualized as the traversal of a graph. Each vertex $V_{i,j}$ of the graph represents the set of energy optimal initial subschedules that consist of exactly 'i' video and 'j' audio frame tasks. Vertex $V_{i,j}$ is associated with a time window $w_{i,j}$, the range of feasible completion times $T_{split}$ of initial subschedules. An edge from vertex $V_{i,j}$ to vertex $V_{i+1,j}$ represents the execution of video task $\tau_i$ immediately after an initial subschedule. Execution of $\tau'_j$ is similarly represented by an edge from $V_{i,j}$ to vertex $V_{i,j+1}$.

TABLE 2

Exemplary Pseudocode for Generating Execution Schedule

```
1:  Given τ₀ display time t₀ let:
2:
3:  t_{i,j(max)} = max(R_{i-1}, R'_{j-1})
4:  t_{i,j(min)} = max(M_{i-1}, M'_{j-1})
5:
6:  t₀ = Σ_{i=0}^{b-1} T_{i,0} + Σ_{j=0}^{b'-1} T'_{j,0}

7:  Procedure SCHEDULE
8:  for K = 0 to K_max do
9:      i = 1, j = 0: create vertex V_{1,0} and vertex V_{0,1}
10:     record execution of τ₀ in V_{1,0}
11:     record execution of τ'₀ in V_{0,1}
12:     repeat
13:         repeat
14:             Conditionally generate vertices V_{i+1,j} and V_{i,j+1}
15:             for t = 0 to (t_{i,j(max)} − t_{i,j(min)}) do
16:                 if V_{i,j+1} exists and an initial subschedule has been
                        recorded for time window offset t then
17:                     Consider execution of τ_i (all voltages) after the initial
                            subschedule, such that τ_i meets timing constraints
18:                     Record new subschedule in V_{i+1,j} if it has lower energy
                            than found so far at the same offset V_{i+1,j}
19:                 end if
20:                 repeat steps 18–20 for V_{i,j+1} and τ'_j
21:             end for
22:             i + +
23:         until i > N or vertex V_{i+1,j} does not exist
24:         j + +/* next row */
25:         i = lowest numbered col such that V_{col,j} exists
26:     until j > N'
27:     if a new optimal schedule found then
28:         keep it
29:     end if
30:     delete the graph
31: end for
32: report the optimal schedule
```

Line 14 of the pseudocode creates and visits vertices, one "row" at a time, each row covering all the values of 'i' for fixed value of 'j'. A vertex is created if its subscripts satisfy the constraints on i and j such that $t_{i,j(min)} < \min(R_i, R'_j)$. At vertex $V_{i,j}$, the present invention iterates through the time window (lines 15–21 of the pseudocode). At each $T_{split}$, the present invention considers what would happen if task $\tau_i$ or task $\tau'_j$ were to execute next at each voltage level. Execution of a task at a voltage that causes it to miss its deadline is discarded. For each point in the time window, each proposed next task execution is appended to the best initial subschedule. If the resulting longer subschedule has lower energy than that recorded in the next vertex, then the record in that vertex is overwritten (line 18 of the pseudocode).

Once the present invention reaches vertex (N, N'), it scans all of the entries in the time window of (N, N') to find the schedule that uses the least energy. To extract the best schedule, the present invention traces backward through the graph, building a stack of task numbers, start times, and voltage settings.

The outer loop of the pseudocode of Table 2 executes for all possible settings of the skew between streams (K). K ranges from 0 to $K_{max}$.

Figure 5:
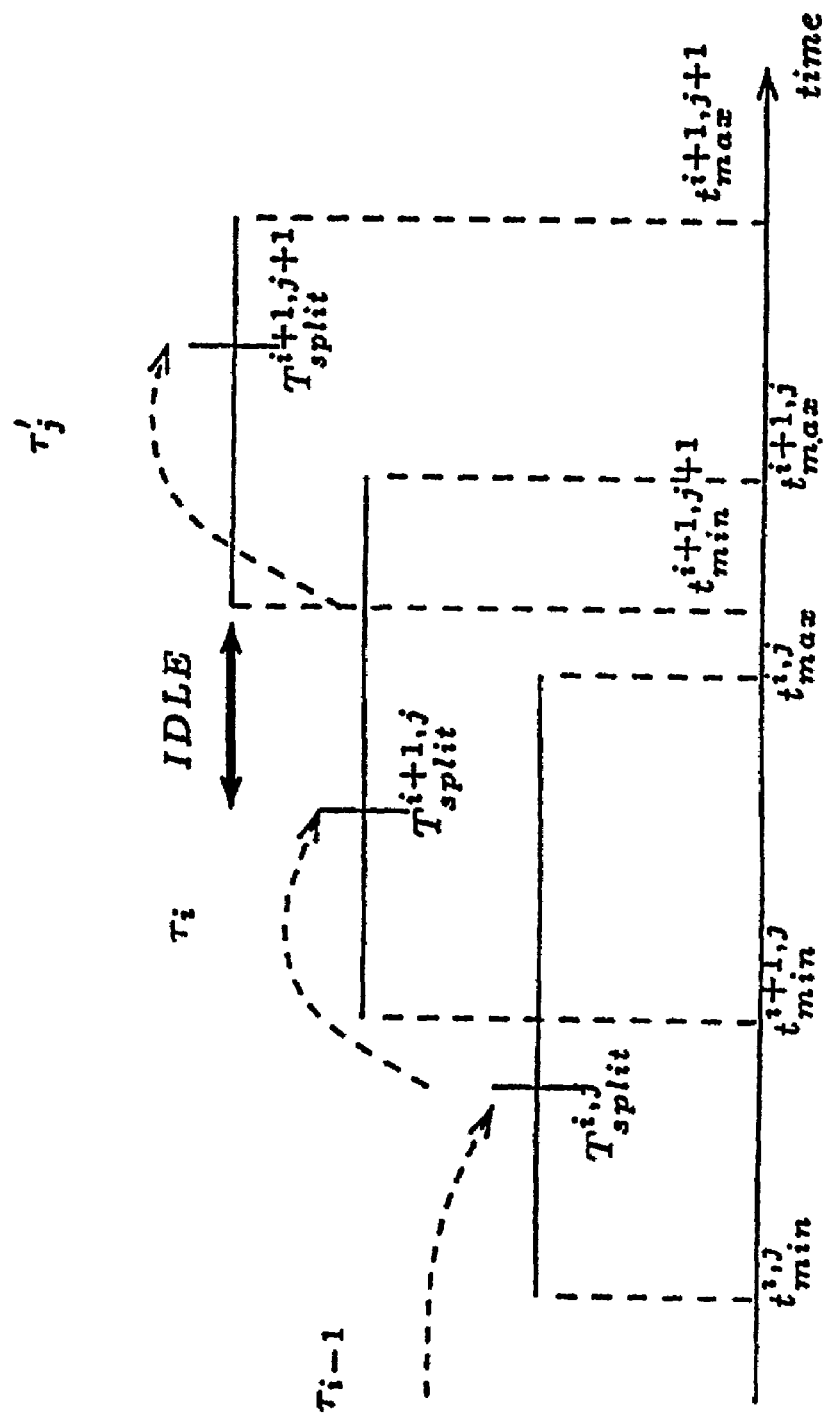
FIG. 5 shows an exemplary flow for executing decoding tasks in accordance with one embodiment of the present invention.

FIG. 5 shows an exemplary flow for executing decoding tasks $\tau_{i-1}$, $\tau_i$, and $\tau'_j$ in accordance with one embodiment of the present invention. There is an idle time between the completion of $\tau_i$ and the start of $\tau'_j$ because $\tau'_j$ is delayed until its minimum start time.

Figure 6:
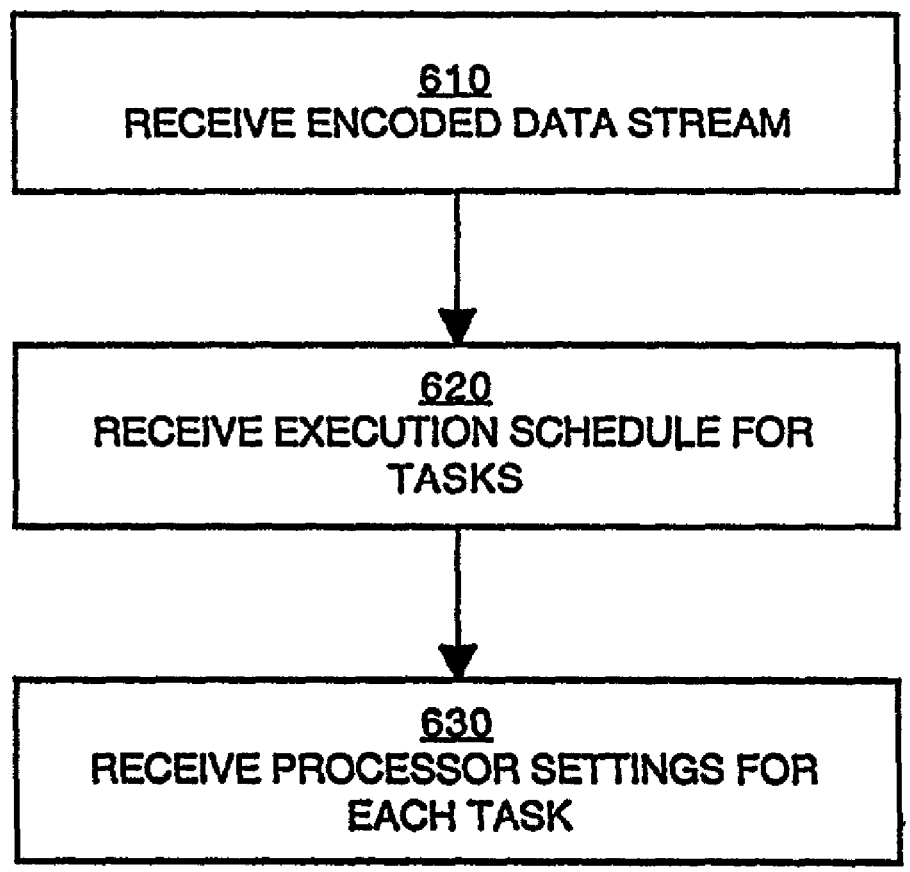
FIG. 6 is a flowchart showing the steps in a process implemented by a client device for decoding encoded data in accordance with one embodiment of the present invention.

FIG. 6 is a flowchart showing the steps in a process 600 implemented by a client device (e.g., portable device 100 of FIG. 1A) for decoding encoded data in accordance with one embodiment of the present invention.

In step 610 of FIG. 6, portable device 100 receives the encoded multimedia data stream. As described above (see the discussion pertaining to FIG. 3), the encoded data stream may be received separately from the execution schedule and processor settings generated by the server device (e.g., computer system 200 of FIG. 1B), or the encoded data stream may be received with the execution schedule and processor settings.

In step 620 of FIG. 6, portable device 100 receives the execution schedule from computer system 200. In step 630, portable device 100 receives from computer system 200 the processor settings for each task in the execution schedule.

With the execution schedule and processor settings, portable device 100 can efficiently decode the encoded multimedia data. Portable device 100 performs each decoding task in the sequence specified by the execution schedule, at the voltage setting specified for the task. By varying the voltage settings according to the execution schedule, portable device 100 is able to conserve battery power.

In summary, the present invention can reduce the energy consumption for the decoding (as well as the display) of multimedia data streams such as MPEG-encoded synchronized multimedia streams. The present invention also can be used for non-preemptable tasks and for tasks that are subject to precedence constraints. Furthermore, the present invention can be used for multimedia applications with real time constraints on audio and video sampling rates and on intrastream and interstream synchronization. In addition, the present invention can be used with a portable device that has a processor that operates on a discrete variable voltage power supply and that has limited buffer capacity.

The preferred embodiment of the present invention, low power scheduling for multimedia systems, is thus described. While the present invention has been described in particular embodiments, it should be appreciated that the present invention should not be construed as limited by such embodiments, but rather construed according to the following claims.

What is claimed is:

1. In a server device, a method for processing an encoded data stream wherein said encoded data stream is non-preemptable and subject to precedence constraints, said method comprising:

assigning a processor settings to tasks in a plurality of tasks, wherein a respective processor setting corresponds to a setting used by a processor of a client device to execute a task of said plurality of tasks and wherein said task decodes without preemption a frame of said encoded data stream;

generating an execution schedule for decoding said encoded data stream, wherein said execution schedule comprises a sequence for executing at said client device said plurality of tasks according to precedence constraints of the encoded data stream that fix the order for executing at least a subset of said tasks;

transmitting to said client device said execution schedule and said processor settings;

and wherein said processor of said client device operates using a discrete variable-voltage power supply.

2. The method as recited in claim 1 wherein said processor setting comprises a voltage amount used by said processor to execute said task.

3. The method as recited in claim 1 wherein said processor setting comprises a processor clock speed at which said processor executes said task.

4. The method as recited in claim 1 wherein said encoded data stream comprises an audio portion and a video portion, said video portion comprising a first frame and a second frame, wherein decoding of said first frame is dependent on decoding of said second frame.

5. The method as recited in claim 1 wherein said generating said execution schedule is independent of client device type.

6. The method as recited in claim 1 wherein said step of generating said execution schedule comprises:

generating different sequences for executing a subset of said plurality of tasks; and selecting a sequence that results in minimum energy use by said processor of said client device.

7. The method as recited in claim 1 comprising:

transmitting said encoded data stream to said client device with said execution schedule and said processor setting.

8. The method as recited in claim 1 wherein said step of generating said execution schedule comprises:

identifying a set of feasible execution schedules;

separating each of said feasible execution schedules at least into respective first subschedules and respective second subschedules, wherein a second subschedule begins at a point where a corresponding first subschedule ends, wherein said point is selected such that said second subschedules are independent of said first subschedules;

selecting one of said first subschedules that results in minimum energy use by said processor of said client device;

selecting one of said second subschedules that results in minimum energy use by said processor of said client device; and concatenating said one of said first subschedules and said one of said second subschedules to generate at least a portion of said execution schedule.

9. A computer system comprising:

a bus;

a memory unit coupled to said bus;

a communication interface coupled to bus and operable to establish a communication link with a client device;

and a processor coupled to said bus, said processor for executing a method for processing an encoded data stream wherein said encoded data stream is non-preemptable and subject to precedence constraints, said method comprising;

assigning a processor settings to tasks in a plurality of tasks, wherein a respective processor setting corresponds to a setting used by a processor of said client device to execute a task and wherein said task decodes without preemption a frame of said encoded data stream;

generating an execution schedule for decoding said encoded data stream, wherein said execution schedule comprises a sequence for executing at said client device said plurality of tasks according to precedence constraints of the encoded data stream that fix the order for executing at least a subset of said tasks;

transmitting to said client device said execution schedule and said processor settings;

and wherein said processor of said client device operates using a discrete variable-voltage power supply.

10. The computer system of claim 9 wherein said processor setting comprises a voltage amount used by said processor of said client device to execute said task.

11. The computer system of claim 9 wherein said processor setting comprises a processor clock speed at which said processor of said client device executes said task.

12. The computer system of claim 9 wherein said encoded data stream comprises an audio portion and a video portion, said video portion comprising a first frame and a second frame, wherein decoding of said first frame is dependent on decoding of said second frame.

13. The computer system of claim 9 wherein said generating said execution schedule is independent of client device type.

14. The computer system of claim 9 wherein said generating comprises:
generating different sequences for executing a subset of said plurality of tasks; and
selecting a sequence that results in minimum energy use by said processor of said client device.

15. The computer system of claim 9 wherein said method comprises:
transmitting said encoded data stream to said client device with said execution schedule and said processor setting.

16. A computer-usable medium having computer-readable program code embodied therein for causing a computer system to perform a method of processing an encoded data stream, said method comprising:
assigning processor settings to tasks in a plurality of tasks, wherein a respective processor setting corresponds to a setting used by a processor of a client device to execute a task of said plurality of tasks and wherein said task decodes without preemption a frame of said encoded data stream;
generating an execution schedule for decoding said encoded data stream, wherein said execution schedule comprises a sequence for executing at said client device said plurality of tasks according to precedence constraints of the encoded data stream that fix the order for executing at least a subset of said tasks;
transmitting to said client device said execution schedule and said processor settings;
and wherein said processor of said client device operates using a discrete variable-voltage power supply.

17. The computer-usable medium of claim 16 wherein said processor setting comprises a voltage amount used by said processor to execute said task.

18. The computer-usable medium of claim 16 wherein said processor setting comprises a processor clock speed at which said processor executes said task.

19. The computer-usable medium of claim 16 wherein said encoded data stream comprises an audio portion and a video portion, said video portion comprising a first frame and a second frame, wherein decoding of said first frame is dependent on decoding of said second frame.

20. The computer-usable medium of claim 16 wherein said step of generating said execution schedule is independent of client device type.

21. The computer-usable medium of claim 16 wherein said computer-readable program code embodied therein causes a computer system to perform said method comprising:
generating different sequences for executing a subset of said plurality of tasks; and
selecting a sequence that results in minimum energy use by said processor of said client device.

22. The computer-usable medium of claim 16 wherein said computer-readable program code embodied therein causes a computer system to perform said method comprising:
transmitting said encoded data stream to said client device with said execution schedule and said processor setting.

23. In a client device, a method for decoding an encoded data stream, said method comprising:
receiving said encoded data stream, wherein said encoded data stream is non-preemptable and subject to precedence constraints of the encoded data stream that fix the order for executing at least a subset of said tasks;
receiving an execution schedule for decoding said encoded data stream, wherein said execution schedule comprises a sequence for executing a plurality of tasks according to said precedence constraints, wherein a task decodes without preemption a frame of said encoded data stream;
receiving a processor setting for each task in said plurality of tasks, wherein said processor setting specifies a setting used by a processor of said client device to execute a respective task;
and wherein said processor of said client device operates using a discrete variable-voltage power supply.

24. The method as recited in claim 23 wherein said processor setting comprises a voltage amount used by said processor of said client device to execute said task.

25. The method as recited in claim 23 wherein said processor setting comprises a processor clock speed at which said processor of said client device executes said task.

26. The method as recited in claim 23 wherein said encoded data stream comprises an audio portion and a video portion, said video portion comprising a first frame and a second frame, wherein decoding of said first frame is dependent on decoding of said second frame.

* * * * *

UNITED STATES PATENT AND TRADEMARK OFFICE
CERTIFICATE OF CORRECTION

PATENT NO. : 7,043,557 B2 Page 1 of 1
APPLICATION NO. : 09/895048
DATED : May 9, 2006
INVENTOR(S) : Malena Rosa Mesarina et al.

It is certified that error appears in the above-identified patent and that said Letters Patent is hereby corrected as shown below:

In column 14, line 64, in Claim 9, delete "comprising;" and insert -- comprising: --, therefor.

Signed and Sealed this

Second Day of June, 2009

JOHN DOLL
*Acting Director of the United States Patent and Trademark Office*